United States Patent
Guibet

(10) Patent No.: US 8,493,063 B2
(45) Date of Patent: Jul. 23, 2013

(54) GEARBOX POSITION SENSOR AND CORRESPONDING GEARBOX

(75) Inventor: Vincent Guibet, Mondeville (FR)

(73) Assignee: SC2N, Creteil (FR)

( * ) Notice: Subject to any disclaimer, the term of this patent is extended or adjusted under 35 U.S.C. 154(b) by 147 days.

(21) Appl. No.: 12/808,198

(22) PCT Filed: Dec. 15, 2008

(86) PCT No.: PCT/FR2008/001739
§ 371 (c)(1),
(2), (4) Date: Aug. 24, 2010

(87) PCT Pub. No.: WO2009/106701
PCT Pub. Date: Sep. 3, 2009

(65) Prior Publication Data
US 2010/0308802 A1 Dec. 9, 2010

(30) Foreign Application Priority Data
Dec. 17, 2007 (FR) ..................... 07 08767

(51) Int. Cl.
*G01R 33/02* (2006.01)

(52) U.S. Cl.
USPC ............ 324/207.13; 324/207.21; 324/207.22; 324/207.25

(58) Field of Classification Search
None
See application file for complete search history.

(56) References Cited

U.S. PATENT DOCUMENTS

| | | | |
|---|---|---|---|
| 2,225,205 A | 12/1940 | Brooks | |
| 4,519,266 A * | 5/1985 | Reinecke | 74/471 XY |
| 4,660,430 A * | 4/1987 | Bortfeld et al. | 74/335 |
| 4,700,133 A * | 10/1987 | Day | 324/207.15 |
| 4,745,363 A * | 5/1988 | Carr et al. | 324/207.2 |
| 5,450,009 A * | 9/1995 | Murakami | 324/207.21 |
| 5,529,715 A * | 6/1996 | Kuroda et al. | 510/349 |
| 5,781,005 A * | 7/1998 | Vig et al. | 324/207.2 |
| 5,814,985 A * | 9/1998 | Oudet | 324/207.2 |
| 6,205,858 B1 | 3/2001 | Palfenier et al. | |
| 6,305,075 B1 * | 10/2001 | Ersoy et al. | 29/829 |
| 7,026,809 B2 * | 4/2006 | Dufour | 324/207.2 |
| 7,030,608 B2 * | 4/2006 | Kawashima et al. | 324/207.25 |
| 7,552,659 B2 * | 6/2009 | Komatsu et al. | 74/335 |
| 7,829,805 B2 * | 11/2010 | Ersoy et al. | 200/61.88 |
| 2011/0001470 A1 * | 1/2011 | Monteil et al. | 324/207.2 |

FOREIGN PATENT DOCUMENTS

| | | |
|---|---|---|
| DE | 39 29 937 A1 | 3/1991 |
| DE | 197 31 960 A1 | 2/1998 |
| EP | 0 273 874 A2 | 7/1988 |
| EP | 0 330 815 A2 | 9/1989 |
| KR | 100761634 B1 | 9/2007 |

OTHER PUBLICATIONS

International Search Report issued in PCT/FR2008/001739, mailed on Jul. 21, 2009, with translation, 6 pages.

* cited by examiner

*Primary Examiner* — Richard Isla Rodas
(74) *Attorney, Agent, or Firm* — Osha Liang LLP

(57) ABSTRACT

A motor vehicle gearbox position sensor includes a magnet and a probe for measuring a magnetic field at a sensitive end. The magnet and the probe may be placed facing a moving target connected to an actuating element, which is used to select the gear ratios of a gearbox in order to determine the position of the target in space and, from this, deduce the position. The position sensor also includes at least one ferromagnetic element positioned at the periphery of the sensitive end to trap metallic contaminants. A motor vehicle gearbox includes an actuating element that selects gear ratios, a moving target connected to the actuating element, and a position sensor.

10 Claims, 2 Drawing Sheets

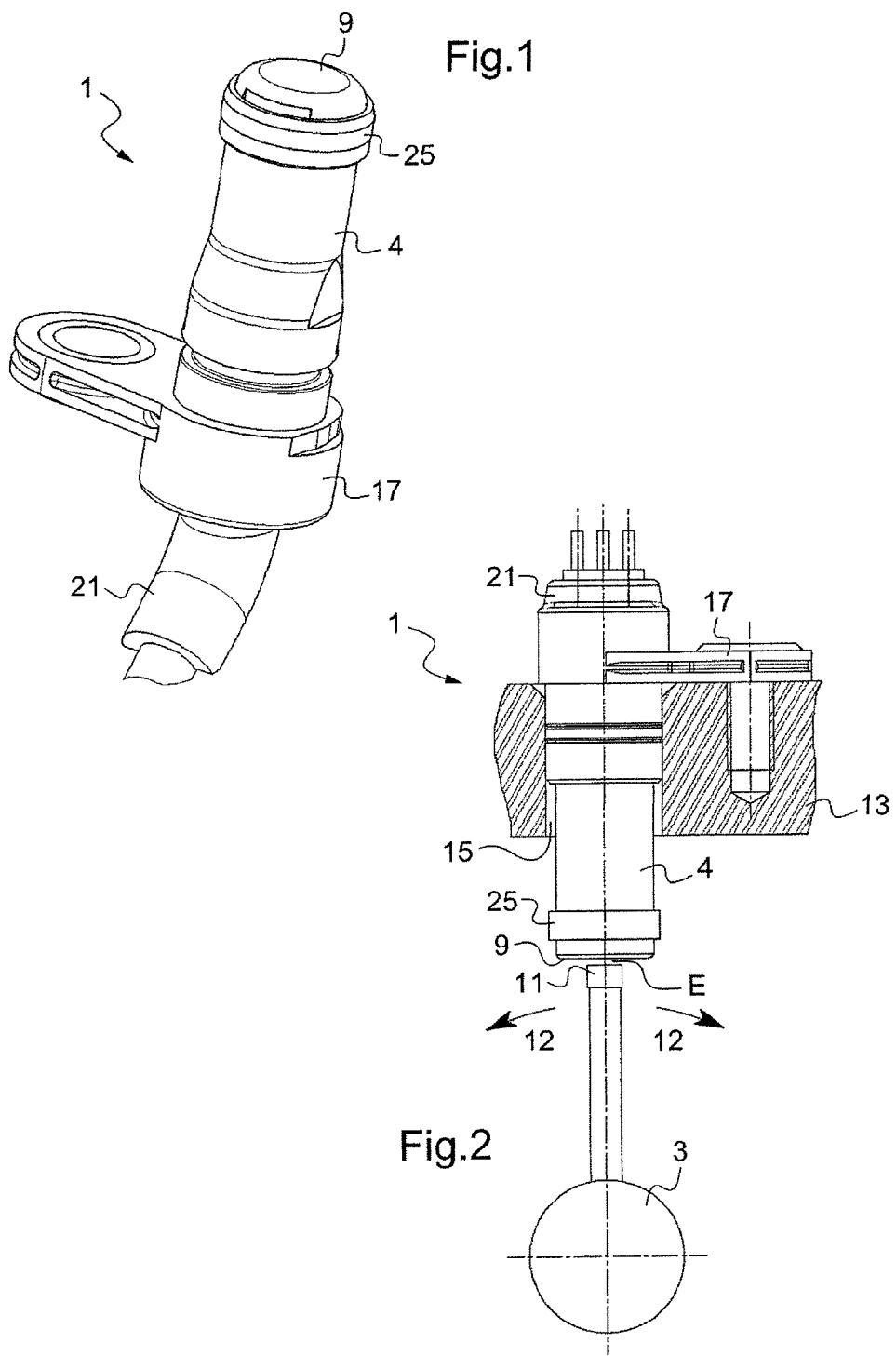

GEARBOX POSITION SENSOR AND CORRESPONDING GEARBOX

Figure 3:
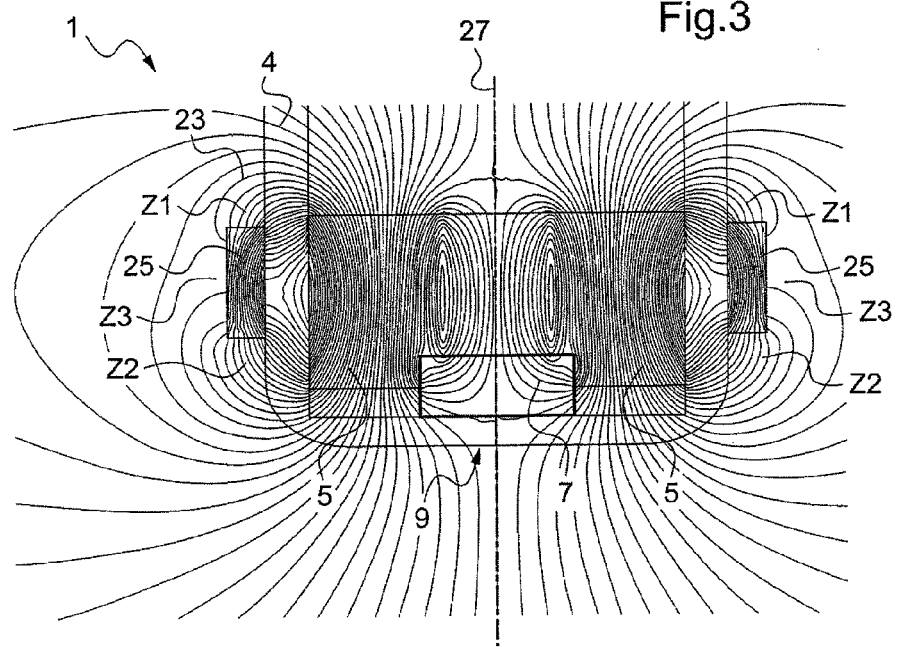

The present invention relates to a motor vehicle gearbox position sensor and to a corresponding gearbox.

Position sensors for automatic or semi-automatic gearboxes are known. These sensors are provided right from the design stage of a gearbox and are incorporated into the latter, often at the actuators used for performing the gear shifts. There are various technologies used for these sensors. For example, position sensors based on a potentiometer for determining the position of an actuator and from this deducing the position of the gearbox, that is to say deducing whether a gear ratio has been selected and, if so, which one, are known.

Other technologies, such as magnetic technologies, have also recently started to be applied to automatic or semi-automatic gearbox position sensors. These sensors are sensitive to the presence or absence of a moving target facing them.

However, motor vehicle gearboxes, particularly mechanical gearboxes, have parts rotating inside a lubricated housing that may generate metallic contaminants such as iron filings.

In operation, these iron filings may be thrown out toward the magnetic-effect sensors which attract and hold them in the region of strong magnetic field of the air gap situated between the sensor and the target, thus skewing the measurement.

To alleviate these problems, the invention proposes a motor vehicle gearbox position sensor comprising a magnet and a probe able to measure a magnetic field at a sensitive end able to be placed facing a moving target connected to an actuating element used to select the gear ratios, in order to determine the position of the target in space and from this deduce the position of the gearbox, characterized in that it further comprises at least one ferromagnetic element positioned at the periphery of the sensitive end to trap metallic contaminants.

According to other features of the position sensor:
the ferromagnetic element is in the form of a ring able to collaborate with a complementary shape of said sensor,
the ferromagnetic element is placed outside a casing of said sensor and preferably comprises clip-fastening means able to collaborate with the casing of said sensor so as to secure the ferromagnetic element to the casing,
the ferromagnetic element is positioned inside a casing of said sensor,
the annular ferromagnetic element and the magnet have a common axis of revolution,
the sensor comprises a plurality of ferromagnetic elements positioned at the periphery of the sensitive end,
the probe is a Hall-effect probe.

Another subject of the invention is a motor vehicle gearbox comprising an actuating element for selecting the ratios and a moving target connected to said actuating element, characterized in that it comprises a position sensor as described hereinabove.

Advantageously, the sensitive end of the position sensor faces said target when the actuating element that selects the gear ratios is in the neutral position.

Figure 4:
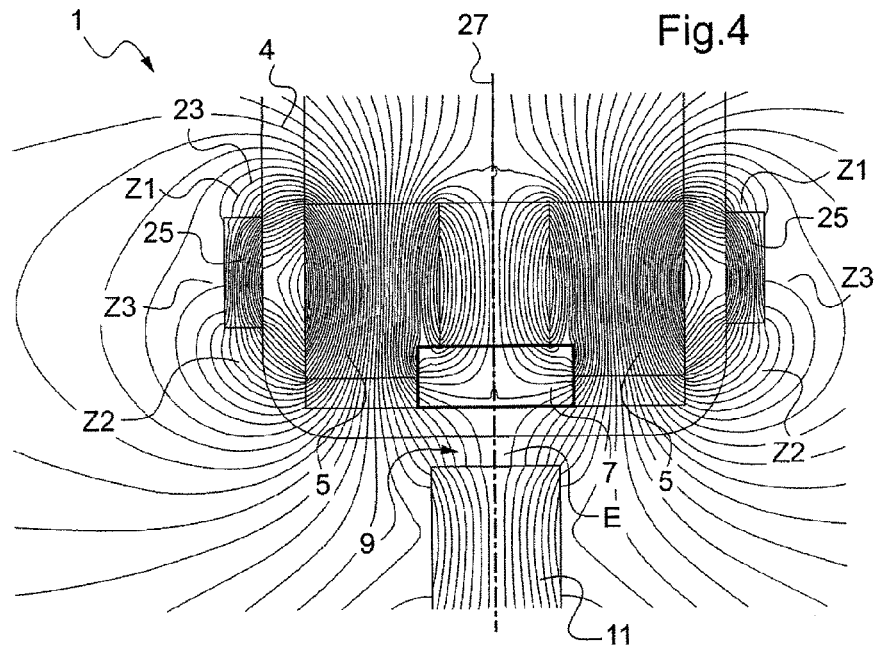

Other advantages and features will become evident from reading the description of the invention, and from studying the attached drawings in which:

FIG. 1 is a perspective and side view of a position sensor according to the invention, FIG. 2 is a schematic view of the sensor in a gearbox, FIG. 3 is a schematic sectioned view of the end of the sensor, and FIG. 4 depicts the end of the sensor of FIG. 3 positioned facing a gearbox target.

In these figures, elements that are identical bear the same reference numerals.

FIG. 1 depicts a position sensor 1 according to the invention, able to be mounted on a motor vehicle manual or automatic gearbox housing 3, to determine the position of the gearbox.

This sensor 1 is particularly suited to detecting the neutral position in vehicles equipped with the "STOP&START" system that switches the engine off when the vehicle stops and restarts it automatically or at the command of the driver.

The gearbox (not shown) comprises an actuating element for selecting the various gear ratios (FIG. 2) according to the commands applied by a gear shift lever via a linkage (see for example the gearbox described in EP 0 273 874).

The actuating element 3 may, for example, be an actuating rod, a fork or a gearbox cam.

As can best be seen in FIG. 3, the position sensor 1 comprises, inside a casing 4, first, a magnet 5, for example an annular magnet and second, a probe 7 able to measure a magnetic field at a sensitive end 9 of the sensor 1.

The probe is preferably a Hall-effect probe.

It is also possible to provide a magnetoresistive probe.

The sensitive end 9 can be situated facing a moving target 11 connected to the actuating element 3 that selects the gear ratios so as to determine the position of the target 11 in space and from this deduce the position of the gearbox.

The target 11 is connected to the actuating element 3 that selects the gear ratios so that it can rotate as one with it (see arrows 12 in FIG. 2) or translate as one with it and be representative of whether a gear has been engaged or whether the box is in neutral.

For example, the end 9 of the sensor 1 faces the target 11 when the gearbox is in neutral.

The gearbox comprises a housing 13 isolating a lubricated interior zone of the gearbox from an exterior zone and through which the sensor 1 passes at a sealed passage 15.

For preference, the sensor 1 has a fixing flange 17 for fixing the sensor 1 to the housing 13.

The sensor 1 further comprises a casing 4 advantageously comprising sealing means able to collaborate with the housing 13, so that the interior zone of the gearbox can be isolated from the exterior zone.

The sealing means comprise, for example, a seal.

Further, the sensor 1 advantageously comprises, at the zone outside the housing 13, an electrical connector 21 that can be connected to a cable in order notably to power the sensor 1 and transmit the signals thereof (see FIG. 1).

As better visible in FIG. 3, the magnet 5 is positioned near the probe 7, so that the magnetic field lines 23 formed between the magnet 5 and the target 11 pass through the probe 7.

Thus, when the target 11 is substantially facing the probe 7, the magnetic field of the magnet 5 is deformed toward the target 11 and the probe 7 measures high magnetic inductance at an air gap E between the sensor 1 and the target 11.

By contrast, when the target 11 is distant from the sensor 1, the magnetic field naturally loops back around the magnet 5 and the probe 7 measures weak magnetic inductance.

According to the invention, the sensor 1 comprises at least one ferromagnetic element 25 positioned at the periphery of the sensitive end 9 to trap metallic contaminants.

The ferromagnetic element 25 is thus able to create two zones Z1 and Z2 of strong magnetic field, concentrated at the periphery of the end 9 to attract the metallic contaminants rather than these being attracted to the air gap E between the end 9 and the target 11.

Thus, in operation, the contaminants are attracted to the zones Z1 and Z2 distant from the sensitive end 9, on each side of the ferromagnetic element 25, so that they do not influence the measurement taken by the probe 7.

Furthermore, the ferromagnetic element 25 reduces the magnetic field in a third zone Z3 situated at the periphery of the end 9 of the sensor 1 (FIGS. 4 and 5), thus limiting the attraction of the contaminants to the sensor 1.

Furthermore, any splashed lubricant and any movement of the target 11 encourage any metallic contaminants that have become caught on the sensitive end 9 to move toward the zones Z1 and Z2.

Very advantageously, the ferromagnetic element 25 is in the form of a ring able to collaborate with a complementary shape of the sensor 1.

This then optimizes the looping-back of the field lines 23 between the magnet 5 and the annular ferromagnetic element 25.

To make it easier to mount, it is also possible to provide a ring 25 that is radially sectioned and able to be opened up elastically so that it can be slipped into a corresponding groove in the casing 4 of the sensor 1 so that, once assembled, the ring 25 is closed up around the end 9 (this is not depicted).

According to a first embodiment visible in FIGS. 1 to 4, provision is made for the ferromagnetic element 25 to be positioned on the outside of the casing 4 of the sensor 1.

Thus, the ferromagnetic element 25 forms a barrier preventing any contaminants from running along the casing 4 toward the sensitive end 9.

Furthermore, with the ferromagnetic element 25 arranged externally, it is possible for existing sensors to be adapted easily and at low cost.

For preference, the ferromagnetic element 25 comprises clip-fastening means able to collaborate with the casing 4 of the sensor 1 so as to secure the ferromagnetic element 25 to the casing 4.

According to a second embodiment which has not been depicted, provision is made for the ferromagnetic element 25 to be positioned inside the casing 4 of the sensor 1.

Advantageously, the annular magnetic element 25 and the magnet 5 have a common axis of revolution 27.

Provision may also be made for the sensor 1 to comprise a plurality of ferromagnetic elements 25 positioned at the periphery of the sensitive end 9.

It will be appreciated that a magnetic-effect gearbox position sensor 1 with a ferromagnetic element 25 positioned at the periphery of its sensitive end 9 is able to trap metallic contaminants away from the sensitive end 9 likely to lie facing the target 11 in order to determine the position of the gearbox.

The invention claimed is:

1. A motor vehicle gearbox position sensor comprising:
a casing;
a magnet and a probe, both located inside the casing,
the probe being for measuring a magnetic field at a sensitive end,
wherein the sensitive end is placed facing a moving target connected to an actuating element used to select gear ratios,
wherein the magnetic field is measured to determine a position of the target in space and to deduce the position of the gearbox using the position of the target; and
at least one ferromagnetic element positioned against the casing, at a position adjacent to the sensitive end so as to attract metallic contaminants away from the sensitive end.

2. The position sensor as claimed in claim 1, wherein the ferromagnetic element is in the form of a ring able to collaborate with a complementary shape of said sensor.

3. The position sensor as claimed in claim 2, wherein the annular ferromagnetic element and the magnet have a common axis of revolution.

4. The position sensor as claimed in claim 1, wherein the ferromagnetic element is placed outside the casing of said sensor.

5. The position sensor as claimed in claim 4, wherein the ferromagnetic element comprises a clip-fastener configured to collaborate with the casing of said sensor so as to secure the ferromagnetic element to the casing.

6. The position sensor as claimed in claim 1, wherein the ferromagnetic element is positioned inside the casing of said sensor.

7. The position sensor as claimed in claim 1, further comprising a plurality of ferromagnetic elements positioned at the periphery of the sensitive end.

8. The position sensor as claimed in claim 7, wherein the probe is a Hall-effect probe.

9. A motor vehicle gearbox comprising:
an actuating element for selecting gear ratios;
a moving target connected to said actuating element; and
a position sensor as claimed in claim 1.

10. The gearbox as claimed in claim 9, wherein the sensitive end of the position sensor faces said target when the actuating element that selects the gear ratios is in a neutral position.

* * * * *